United States Patent [19]
Sidqi et al.

[11] Patent Number: 6,063,843
[45] Date of Patent: May 16, 2000

[54] SYNERGISTIC ADDITIVE SYSTEM FOR THE STABILIZATION OF POLYAMIDES

[75] Inventors: Mohamed Sidqi, Mulhouse, France; Klaus Stoll, Binzen, Germany; Jan Malik, St. Louis, France; Joseph Reni Webster, Charlotte, N.C.

[73] Assignee: Clariant Finance (BVI) Limited, Tortola, Virgin Islands (Br.)

[21] Appl. No.: 09/138,854

[22] Filed: Aug. 24, 1998

Related U.S. Application Data

[63] Continuation-in-part of application No. 08/936,008, Sep. 23, 1997, Pat. No. 5,969,014.

[51] Int. Cl.$^7$ .................................................. C08K 5/34
[52] U.S. Cl. ........................... 524/100; 524/99; 524/106; 524/126; 524/227
[58] Field of Search ............................. 524/99, 100, 102, 524/126, 227

[56] References Cited

U.S. PATENT DOCUMENTS

| | | | |
|---|---|---|---|
| 4,107,138 | 8/1978 | Hofer et al. | 524/126 |
| 4,474,914 | 10/1984 | Spivack | 524/126 |
| 4,902,299 | 2/1990 | Anton | 8/442 |
| 5,045,083 | 9/1991 | Bennett | 8/442 |
| 5,338,319 | 8/1994 | Kaschig et al. | 8/586 |
| 5,380,774 | 1/1995 | Mulholland | 524/102 |
| 5,438,086 | 8/1995 | Stevenson et al. | 524/120 |

FOREIGN PATENT DOCUMENTS

WO 97/43335  11/1997  WIPO.

Primary Examiner—Kriellion Sanders
Attorney, Agent, or Firm—Miles B. Dearth; Susan Jackson

[57] ABSTRACT

Disclosed is a process for stabilizing polyamides against the damage effected by light, heat and/or oxidation while improving the differential dyeability, and processing stability therefore, comprising incorporating therein by melt-processing a synergistic additive system resulting in a uniform and intimate mixture with said polyamide, said additive system is selected from the group consisting of (I), (II) and (III)

(I) is from 0.01% to 1% by weight of a sterically hindered phenylphosphonite (Ia) with from 0.05% to 5% by weight of oxanilide (Ib) or said (Ia) together with from 0.05% to 5% by weight of an aromatic di- or tri-carbonyl compound containing at least one, and preferably two hindered amine moieties (Ic);

(II) is from 0.05% to 5% by weight of oxanilide (IIa) together with from 0.05% to 5% by weight of a aromatic di- or tri-carbonyl compound (IIb) containing at least one hindered amine moieties;

(III) is from 0.01% to 1% by weight of a sterically hindered phenyl phosphonite (Ia), from 0.05% to 5% by weight of a oxanilide (Ib) and from 0.05% to 5% by weight of an aromatic di- or tri-carbonyl compound;

wherein the percentages represent grams of additives used per hundred grams of polymer.

Also disclosed are polyamide articles selected from the group consisting of molded articles, extruded articles and fibers, which optionally contain organic dyes, exhibiting outstanding color brightness and color stability.

19 Claims, No Drawings

SYNERGISTIC ADDITIVE SYSTEM FOR THE STABILIZATION OF POLYAMIDES

This is a continuation-in-part of application Ser. No. 08/936,008 filed Sep. 23, 1997, now U.S. Pat. No. 5,969,014.

FIELD OF THE INVENTION

The invention pertains to methods to stabilize polyamide polymers.

BACKGROUND OF INVENTION

The service life of polyamides is dependent on (1) the raw materials used in the manufacturing process, (2) the additives used in stabilizing the polymer against damage brought about by melt-processing and (3) environmental weathering factors. A serious drawback to providing stabilization systems for polyamides lies in the fact that the maximum concentration of many additives is limited. Polyamides are heretofore regarded as poor in solvating additives, especially non-polar additives having relatively low molecular weight in relation to the polyamide polymer. The aesthetics of an article such as made by molding processes can be affected such as by migration, blooming or plate-out of the additives. On the other hand, manufacturers of polyamide-based molded and extruded goods strive to include low concentrations of additives for economic reasons.

Oxalic acid di-aryl anilides, formed on condensing the acid, partial ester or di-ester with one or two moles of aniline derivatives are known light stabilizers. Unsymmetrical oxalic acid dianilides are described, for example in U.S. Pat. No. 4,003,875.

U.S. Pat. No. 5,045,083 discloses polyamide, copper complex and oxanilide UV absorber.

U.S. Pat. No. 4,544,691 discloses stabilizer compounds containing UV-absorbing derivatives of oxanilide, benzalmalonates, α-cyanocinnamates and o-hydroxyphenylbenzotriazoles, having a reactive phenolic group(s). These additives are suggested for use with polymer coating materials.

U.S. Pat. No. 5,338,319 discloses a polyamide stabilization system containing a copper complex, and water soluble oxalic acid diaryl amide.

U.S. Pat. No. 5,380,774 discloses a polyamide molding composition containing a hindered phenolic antioxidant, phosphite, hindered amine stabilizer and optionally a benzotriazole.

European Publication number EP 0379470 discloses compounds used to improve the dyeability of polyamide. The compounds include a compound containing a sterically hindered amine group, trimesic acid trialkylamide, pyromellitic acid tetra-alkylamide, triamino substituted triazine, a hydroxyl-reactive dyestuff. Compounds containing a sterically hindered amine group are preferably

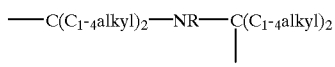

where R is hydrogen, $C_{1-8}$ alkyl, $C_{1-8}$ alkoxy, or $COR_5$.

WIPO publication WO 97/43335 discloses a stabilizer for polyamide having the structure:

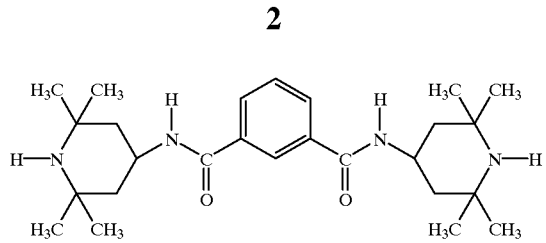

Polyamide polymers are characterized by high tensile strength, Young's modulus and abrasion resistance, however polyamides require stabilization against thermo-oxidative and photodegradation to sustain these properties in demanding use applications. Polyamides must accept lightfast dyeing systems in addition. Discoloration of the resin matrix is highly critical and may cause shade changes in colored articles, such as fibers and moldings of polyamide polymers. Therefore, further improvement in the stabilization systems for these materials is desirable in end uses such as fibers, and generally in high temperature processing of polyamide melts.

The polyamide structure contains labile hydrogens and exert reductive or basic properties which are problematic from the standpoint of colorants. For example, in polyamide, organic red dyes undergo significant loss of shade upon thermal processing at the typical melt processing temperatures for polyamide. It would be desirable to minimize the tendency of polyamide to exert this influence on dyes while at the same time protecting the polymer matrix from loss of the desired physical properties.

The evolution of polyamide stabilization system s has advanced from earlier recommended hindered phenolic types, for example Irganox® 1098, to a combination of an antioxidant and a benzotriazole, such as the combination of Irganox®1098 with Tinuvin® 234, well established I the art. Lightfast and photochemically stable dyed polyamide fibers containing oxalic acid di-aryl amides with a copper complex are known, for example from the aforementioned U.S. Pat. No. 5,338,319. These are applied in aqueous dye baths. In contrast, the present invention is directed to additives which are dispersed within the polyamide matrix by melt-processing at high temperatures above the glass transition, as in extrudates or moldings. WO 97/43335 provides a stabilizer which can be added in the melt to polyamide and improves heat stability, light stability, chemical stability, and dye affinity, however improvements are still sought.

Highly synergistic stabilization systems for polyamides have been found which exhibit unexpected further improvements for polyamide. These systems exhibit significant technical and economic advantages, even at low effective additive concentrations.

SUMMARY OF INVENTION

In accordance with the fundamental aspect of the invention there is provided a process for stabilizing polyamide polymers against the damage effected by light, heat and/or oxidation, even without the use of copper complexes, by using specified additives which act synergistically in polyamides. The process comprises incorporating the additive combinations selected from (I), (II) or (III), under melt processing conditions with polyamide, and forming a uniform and intimate mixture. The components, on a weight basis (I), (II) and (III) are:

(I) from 0.01% to 1% of a sterically hindered phenyl phosphonite (Ia) with from 0.05% to 5% of a oxanilide, (Ib), preferably non-hydroxy substituted, (together (Ia)+(Ib)), or (Ia) together with from 0.05 to 5% of an aromatic di- or tri- carbonyl (ester) amide compound, defined below containing at least one, and preferably two hindered amine moieties (Ic) in particular relationship with the carbonyl group, (together (Ia)+(Ic)). The weight ratio of (Ia) to (Ib) is from 1:3 to 1:10 and the weight ratio of (Ia) to (Ic) is from 1:3 to 1:10. The preferred weight ratios for both (Ia) to (Ib) as well as (Ia) to (Ic) is 1:3 to 1:6. The more preferred weight ratios of (Ia) to (Ib) and (Ia) to (Ic) are from 1:4 to 1:6 and most preferably 1:5;

(II) from 0.05 to 5% of an oxanilide (IIa), preferably non-hydroxy substituted, together with from 0.05 to 5% of an aromatic di- or tri- carbonyl (ester) amide compound containing at least one and preferably two hindered amine moieties (IIb), (together (IIa)+(IIb)). The weight ratio of (IIa) to (IIb) is from 1:5 to 5:1, preferably 1:3 to 3:1, and most preferably 1:1; and (III) from 0.01% to 1% of a sterically hindered phenyl phosphonite, from 0.05 to 5% of an oxanilide, preferably non-hydroxyl substituted, and from 0.05 to 5% of an aromaticdi-or tri- carbonyl (ester)amide compound containing at least one, preferably two hindered amine moieties. The weight ratio of phosphonite to oxanilide is from 1:5 to 5:1, preferably 1:5 to 1:1, and most preferably 1:5 to 1:3 wherein the percentages represents grams of additives used per hundred grams of polymer.

The invention defines the basis, furthermore, for the effective and unexpected improved efficiency in the use of organic colorants with polyamide, such as solvent soluble, or polymer soluble organic dyes, for example, acid dispersed dyes, azo and diazo dyes, phthalocyanine blues and greens, diarylide yellows, perylenes, quinacridone, and the like. Therefore another aspect of the invention is a colored manufactured article such as a molding, extruded article or fiber of polyamide containing the stabilizer system (I), (II) or (III), in combination with one or more organic colorants.

DETAILED DESCRIPTION OF INVENTION

Polyamides stabilized according to the invention include the synthetic aliphatic, semi-aromatic and aromatic polyamides. Examples include nylon 6, nylon- 6.6, nylon-6.10, nylon 6.11, nylon-6.12, nylon 11, nylon 12, and copolymers such as nylon-6.6/6, nylon-6.6/6.10, 6/11, 6/12; polyether-polyamide block copolymers, poly(m-phenyleneisophthalamide), poly(p-phenyleneterephthalamide), and the like all of which are commercially available from a variety of sources. The method includes using the stabilization system with formulated polyamides, including conventional impact toughened polyamide, and reinforced polyamides containing glass fiber, mineral and glass/mineral combinations. The invention can be practiced with polyamides regardless of the polymer morphology. Amorphous, semi-crystalline or highly crystalline polyamides as well as blends of different crystallinity are benefited. Commercially available polyamide resins are known from sources such as BASF, DSM, Evansville, Ind., E I duPont de Nemours, Wilmington, Del.; formulated polyamides are available, for example, from Ferro Corp., Cleveland, Ohio, Hanna Engineered Materials, Bethlehem, Pa., Hutls America, Somerset, N.J., and A. Schulman, Akron, Ohio; reinforced polyamides are available from DSM RIM Nylon, Westlake, Ohio.

The following amounts of each component selected according to the invention are critical to synergistic improvements and are indicated as weight percentage representing grams of additives used per hundred parts of the polyamide. The invention can be practiced by incorporating the additive system directly into heated zones of a compounding extruder containing the polyamide to be stabilized or by first forming an intermediate masterbatch compound which contains the selected system in a carrier polymer which is a polyamide or a polymer which is intimately compatible with or dispersible in polyamide, or by other methods commonly used in the art to incorporate additives into polymers.

According to the selection of ((Ia)+(Ib)) above, from 0.01 to 1% of sterically hindered phenyl phosphonite is used, preferably the usage level is from 0.05% to 0.5% with the most preferred level from 0.05 to 0.2% of the phosphonite. The specified oxanilide used in either (I) or (II) is possible at a level of from 0.05% to 5%, preferably at a level of from 0.2% to 2%, and most preferably at a level of from 0.3% to 1%.

The aromatic di-carbonyl (ester)amide compound containing one or more piperidine groups is used generally in an amount of from 0.05% to 5%, preferably from 0.2% to 2% and most preferably from 0.3% to 1%.

According to (I) above the weight ratio of (Ia) to (Ib) or the ratio of (Ia) to (Ic) is 1:3 to 1:10, especially 1:4, 1:5, 1:6, 1:7, 1:8, and 1:9. According to ((IIa)+(IIb)) above, the weight ratio of (IIa) to (IIb) is from 1:5 to 5:1, especially 1:4, 1:3, 1:2, 1:1, 2:1, 3:1, and 4:1, with the most preferred weight ratio of from 1:2 to 2:1.

The sterically hindered phenyl phosphonites used herein have the following general structure:

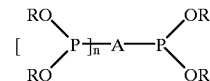

wherein each R is independently selected from unsubstituted phenyl or a substituted phenyl with one, two or three $C_{1-2}$alkyl groups, such as methyl, ethyl, propyl, butyl, isobutyl, tert.-butyl groups, linear or branched pentyl, hexyl, octyl or nonyl groups or cumyl moieties.

Preferably R is a di-tert.-butyl phenyl group (most preferably at the 2,4-position), n is 0 or 1 and A is a predominantly aromatic mono- or difunctional $C_5$ to $C_{30}$ moiety optionally containing further heteroatoms, for example is a monofunctional or difunctional residue of a phenyl, diphenylether, diphenyl, diphenylmethane, or dibenzofuran group. Most preferably A, a diphenyl residue, n=1 and R is a 2,4-di-tert-butyl phenyl group or 2,4-di-tert-butyl-5-methyl phenyl group. The term "sterically hindered" refers to the presence of at least one substituent different from hydrogen, in ortho position to the functional center of the respective group.

The most preferred phenyl phosphonites are the condensation products of sterically hindered alkyl phenols, such as 2,4-di-tertiary butyl phenol, with the Friedel-Crafts reaction product of diphenyl and $PCl_3$. An exemplary condensation product A-2 has the following structure:

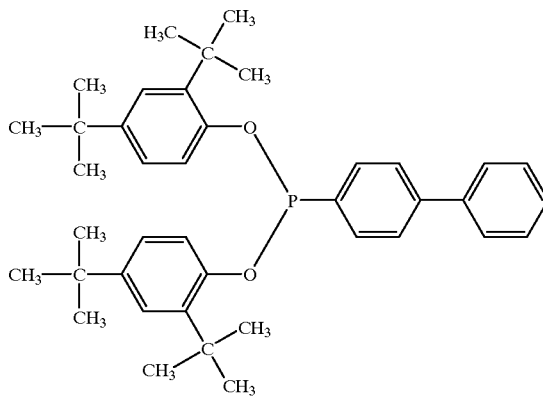
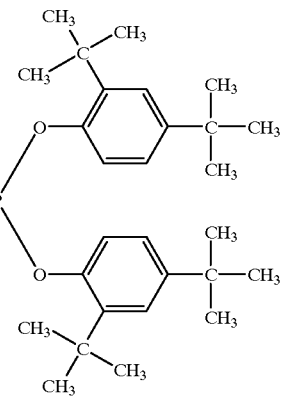

The preferred sterically hindered phosphonite containing A-2 as main component is Sandostab® P-EPQ available from Clariant.

The oxalic acid di-aryl amides (oxanilides) used in the invention include, for example, compounds having the following structures:

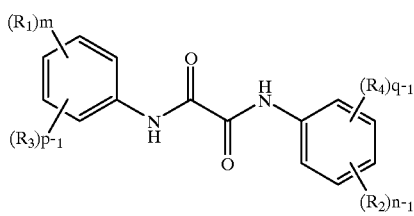

$R_1$ and $R_2$ are each independently of the other hydrogen, unsubstituted $C_1$–$C_{18}$alkoxy or $C_1$–$C_{18}$ alkoxy which is substituted by halogen, hydroxy, $C_1$–$C_5$ alkoxy, carboxyl groups, carbamyl groups or $C_1$–$C_{12}$ alkoxycarbonyl groups, or is $C_3$–$C_5$ alkenyloxy, unsubstituted benzyloxy or benzyloxy which is substituted by halogen or $C_1$–$C_5$alkyl, aliphatic acyloxy containing up to 18 carbon atoms, unsubstituted benzoyloxy or benzoyloxy which is substituted by halogen or $C_1$–$C_4$alkyl, or a radical —A—$SO_3$M, wherein A is a direct bond or a divalent radical of formula —O—Q—, and Q is unsubstituted or hydroxy-substituted $C_1$–$C_6$alkylene, M is hydrogen or alkali metal, $R_3$ and $R_4$ are each independently of the other hydrogen, halogen, $C_1$–$C_{12}$alkyl, haloalkyl, phenyl or phenyl-$C_1$–$C_5$alkyl, or two radicals $R_3$ and/or $R_4$ in ortho-position each together form a fused 6-membered aromatic carbon ring, and wherein m and n are 1 or 2 and p and q are 1, 2 or 3.

The preferred oxalic acid di-aryl amide is non-hydroxy substituted, for example:

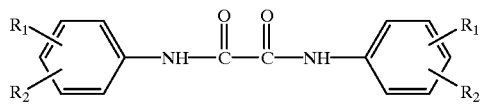

wherein $R_1$ and $R_2$ are each independently, identical or different substituents selected from hydrogen, linear, branched or cyclic alkyl or alkoxy groups having from 2 to 12 carbon atoms and from 1 to 4 oxygen atoms; preferably one $R_1$ group on each ring is hydrogen, one $R_2$ group is ethoxy and the other is a $C_2$ to $C_{12}$ alkyl group, both located at the 5 position of each ring.

The most preferred oxanilides have such structures as:

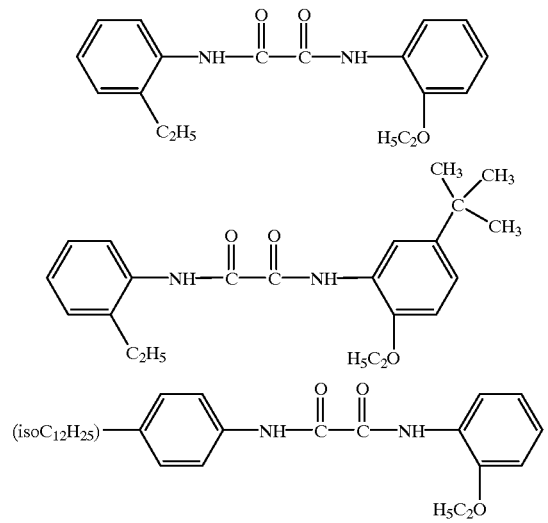

Commercially available non-hydroxyl substituted oxanilides include Sanduvor® VSU and 3206, and Tinuvin® 312 and 315, and the like. The most preferred oxanilide is commercially available from Clariant as Sanduvor® VSU.

The process according to (Ib) or (II) includes the use of an aromatic di- or tri-carbonyl compound which is an aromatic amide or aromatic ester-amide (aromatic (ester)amide) containing at least one hindered amine group adjacent to a carbonyl carbon. The structure is given by:

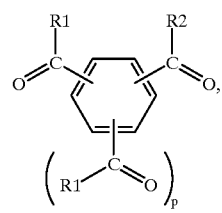

where p 0 or 1, and $R^1$ and $R_2$ is defined as for (A) and (B) below.

When p is 0, the aromatic di-carbonyl (ester)amide is (A) and (B), (A)
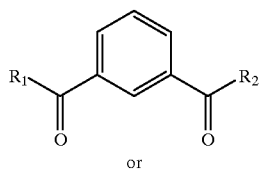
or (B)
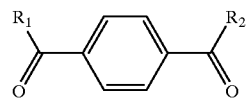

wherein at least one of $R_1$ and $R_2$ are independently, identical or different sterically hindered amino groups adjacent to the carbonyl group and the group(s) which is not a hindered amino group includes independently of the other, unsubstituted $C_1$–$C_{18}$alkoxy or alkamino which may optionally be substituted by halogen, hydroxy, $C_1$–$C_5$ alkoxy, carboxyl groups, carbamyl groups or $C_1$–$C_{12}$ alkoxycarbonyl groups, or is $C_3$–$C_5$ alkenyloxy, unsubstituted benzyloxy or benzyloxy which is substituted by halogen or $C_1$–$C_5$alkyl, aliphatic acyloxy containing up to 18 carbon atoms, unsubstituted benzoyloxy or benzoyloxy which is substituted by halogen or $C_1$–$C_4$alkyl. Exemplary hindered amino groups include those such as (i)–(ix), (i)
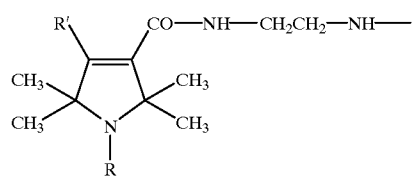

(ii)
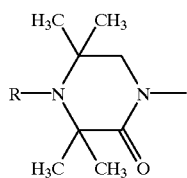

(iii)
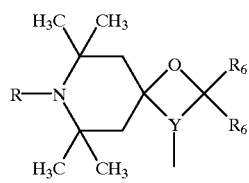

(iv)
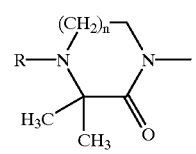

(v)
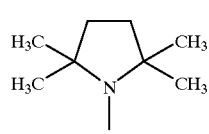

(vi)
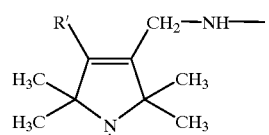

(vii)
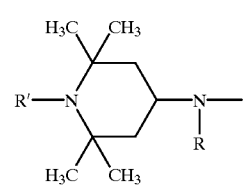

(viii)
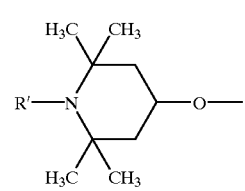

(ix)
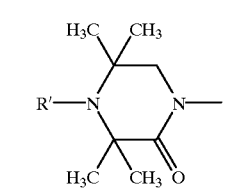

wherein R and R' are independently either hydrogen, $C_{1-12}$alkyl, $C_{1-8}$alkoxy, or —$COR_3$, where $R_3$ is hydrogen, $C_{1-6}$alkyl, phenyl, —COO($C_{1-4}$alkyl) or $NR_{15}R_{16}$, where $R_{15}$ and $R_{16}$ are independently hydrogen, $C_{1-12}$alkyl, $C_{5-6}$cycloalkyl, phenyl or ($C_{1-12}$alkyl)phenyl; or $R_{15}$ and $R_{16}$ together with the N-atom to which they are attached form a five- to seven-membered ring which may contain an additional N- or O-atom (preferably forming a piperidine or morpholine ring); n is 0 or 1 (structure iv); Y is the group —NCO or —OCN, where CO forms part of the cyclic structure; each $R_6$ of structure (iii) independently is selected from hydrogen, $C_{1-12}$alkyl or phenyl provided only one $R_6$ can be phenyl, or both groups $R_6$ together form the group —$(CH_2)_m$—; where m is 2 to 11, —$C(CH_3)_2$—, —$C(CH_3)_2$—$CH_2$—$CH_2$— or —$C(CH_3)CH_2CH_2CH(CH_3)$—.

$R_1$ or $R_2$ groups other than hindered amino groups, include, independently $C_{1-20}$ alkyl, $C_{1-20}$ alkoxyalkyl, $C_{1-20}$ hydroxyalkyl, $C_{1-20}$ alkenyl, substituted $C_{1-20}$ alkenyl groups, $C_{1-20}$-alkoxy-$C_{1-20}$-alkyl groups, $C_{1-20}$-oxy-N-$C_{1-20}$-alkyl groups, $C_7$–$C_9$ phenylalkyl unsubstituted or mono-, di- or tri-substituted on the phenyl by $C_1$–$C_4$alkyl; or aliphatic or aromatic $C_1$–$C_{10}$acyl.

A preferred aromatic dicarbonyl compound is (B'):

(B')

wherein $R_2'$ is independently $C_{1-20}$ alkyl, $C_{1-20}$ alkylamino, optionally further substituted $C_{1-20}$ alkoxyalkyl, $C_{1-20}$ hydroxyalkyl, $C_{1-20}$ alkenyl, substituted $C_{1-20}$ alkenyl groups, $C_{1-20}$-alkoxy-$C_{1-20}$-alkyl groups, $C_{1-20}$-oxy-N-$C_{1-20}$-alkyl groups, -N-cyclic-$C_{1-20}$-alkyl groups, and cyclic-N-$C_{1-10}$-alkyl groups —$COR_4$, where $R_4$ is hydrogen, $C_{1-6}$alkyl, phenyl, —$C_{1-20}$ COO(H or $C_{1-4}$alkyl).

More preferred is the aromatic dicarbonyl compound (B″):

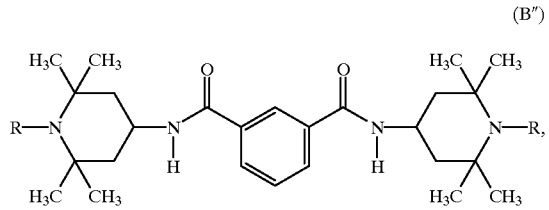

(B″)

wherein each R in B' and B″ is independently either hydrogen, $C_1$-$C_{18}$alkyl, O, OH, $CH_2CN$, $C_1$-$C_{18}$alkoxy, alkoxyalkylenoxyalky, $C_5$-$C_{12}$cycloalkoxy, $C_3$-$C_6$alkenyl, $C_7$-$C_9$ phenylalkyl unsubstituted or mono-, di- or tri-substituted on the phenyl by $C_1$-$C_4$alkyl; or aliphatic or aromatic $C_1$-$C_{10}$ acyl, or —$COR_4$, where $R_4$ is defined as above. Examples of alkyl groups having not more than 20 carbon atoms are methyl, ethyl, propyl, isopropyl, butyl, 2-butyl, isobutyl, t-butyl, pentyl, 2-pentyl, hexyl, heptyl, octyl, 2-ethylhexyl, t-octyl, nonyl, decyl, undecyl, dodecyl, tridecyl, tetradecyl, hexadecyl and octadecyl; exemplary branched alkyl groups are isopropyl, isobutyl, t-butyl, 2,2-dimethylpropyl, 2-methylpropyl, cyclohexylmethyl, cyclohexylethyl, 2-ethylhexyl, 3,5,5-trimethylhexyl, 2-hexylundecyl, and 5,7,7-trimethyl-2-(1,3,3-trimethylbutyl)hexyl; exemplary cyclic alkyl groups are cyclohexyl.

Examples of alkoxy(alkyl) groups are methoxy, ethoxy, propoxy, isopropoxy, butoxy, isobutoxy, pentoxy, isopentoxy, hexoxy, 2-ethylhexyloxy, heptoxy, octoxy, decyloxy, dodecyloxy, tetradecyloxy, hexadecyloxy and octadecyloxy, nonadecyloxy. Preferred alkoxy examples are $C_6$-$C_{12}$alkoxy, in particular heptoxy and octoxy.

Examples of the alkoxyalkylenoxyalkyl groups are $C_{1-20}$-alkoxy-$C_{1-5}$-alkylenoxy-$C_{1-20}$-alkyl groups. The $C_{1-20}$-alkoxy groups and $C_{1-20}$-alkyl groups include those mentioned as examples of the alkoxyalkyl groups. Examples of the $C_{1-5}$-alkylenoxy groups include

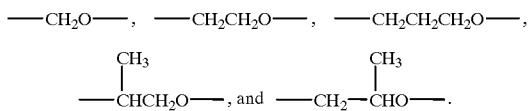

Particularly, $C_{1-12}$-alkoxy-$C_{1-5}$-alkylenoxy-$C_{1-12}$-alkyl groups are more preferred.

Examples of $C_5$-$C_{12}$cycloalkyl $R_3$ unsubstituted or mono-, di- or tri-substituted by $C_1$-$C_4$alkyl are cyclopentyl, methylcyclopentyl, dimethylcyclopentyl, cyclohexyl, methylcyclohexyl, dimethylcyclohexyl, trimethylcyclohexyl, t-butylcyclohexyl, cyclooctyl, cyclodecyl and cyclododecyl. Unsubstituted or substituted cyclohexyl is preferred.

Examples of $C_5$-$C_{12}$cycoalkoxy $R_1$ are cyclopentyl, cyclohexoxy, cycloheptoxy, cyclooctoxy, cyclodecyloxy and cyclododecyloxy, including as applied to $R_3$. Cyclopentoxy and cyclohexoxy are preferred.

Examples of $C_3$-$C_6$ alkenyl are allyl, 2-methylallyl, butenyl and hexenyl, 3-butenyl, and 10-undecenyl; examples of branched alkenyl groups are 1-methyl-2-propenyl, 3-methyl-3-butenyl. Allyl is preferred.

Examples Of $C_7$-$C_9$ phenylalkyl unsubstituted or mono-, di- or tri-substituted on the phenyl by $C_1$-$C_4$alkyl are benzyl, methylbenzyl, dimethylbenzyl, trimethylbenzyl, t-butylbenzyl and 2-phenylethyl. Benzyl is preferred.

Examples of aliphatic and aromatic $C_1$-$C_{10}$ acyl are $C_1$-$C_8$alkanoyl or $C_3$-$C_8$-alkenoyl, for example, acetyl, propionyl, butyryl, isobutyryl, pentanoyl, benzoyl, hexanoyl, heptanoyl, octanoyl, 2-ethylhexanoyl, acryloyl and crotonyl. Acetyl is preferred.

When more than one hindered amine group is present they can be identical or different, and preferably are identical hindered amine groups.

Exemplary aromatic tri-carbonyl compounds are the following C and C',

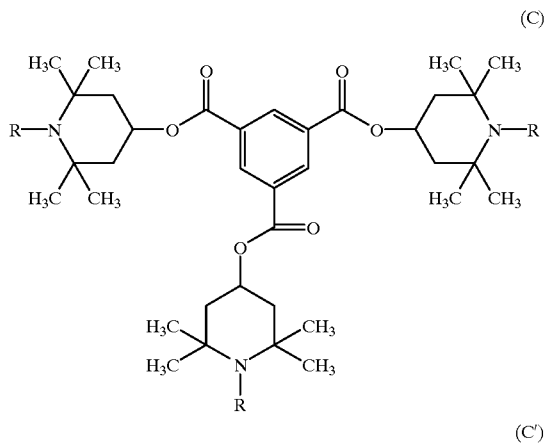

(C)

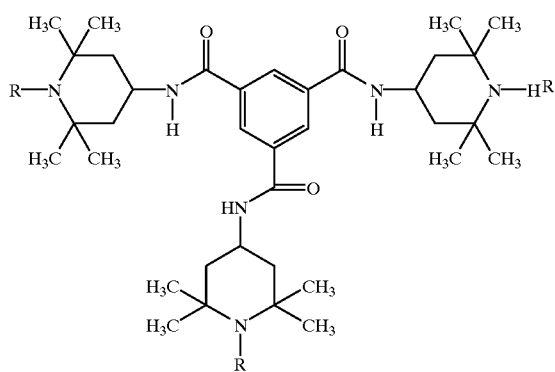

(C')

wherein R is defined as in B″

The most preferred aromatic (ester) amide is an aromatic di-amide having the following structure:

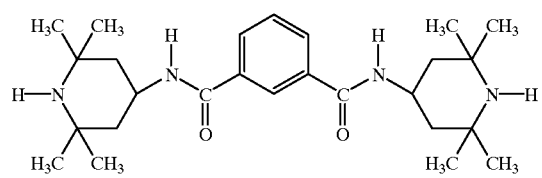

and is commercially available as NYLOSTAB S-EED from Clariant.

The aromatic di-or tri-carbonyl (ester)amide with at least one hindered amino group can have remaining non-hindered amino groups $R_1$ and $R_2$ groups in structures (A) or (B) selected from radicals of substituted or unsubstituted linear or branched alkyl amine(s) or alkoxy groups having 8 to 20 carbon atoms, such as octyl amine and dodecylamine or the corresponding alkohols; substituted or unsubstituted aromatic amine, aminocarboxylic acid or corresponding lactam; also oligomers of about 3 to 20 repeating units of the aromatic dicarbonyl and a diamine or aminocarboxylic acid.

Conventional additives may optionally be present in the polyamide which is modified according to the invention, for example, primary thermal stabilizers, light stabilizers, lubricants, pigments, reinforcing and/or non-reinforcing fillers, and the like. Conventional primary antioxidants are suggested for inclusion herein at conventional amounts. Antioxidants include, for example alkylated monophenols, alkylated hydroquinones, alkylidenebisphenols, hindered alkyl benzyl compounds, acylaminophenols, esters of β-(3, 5-di-tert-butyl-4-hydroxyphenyl) propionic acid, and the like which are disclosed in U.S. Pat. No. 5,051,459 incorporated herein by reference. A commercially available antioxidant is IRGANOX® 1098 from Ciba Specialty Chemicals.

UV-absorbers include, for example, the class of benzotriazoles such as 2-(2'-hydroxphenyl)benzotriazoles, for example 2-(2'-hydroxy-5'-methylphenyl)benzotriazole, 2-(3',5'-di-tert-butyl-2'-hydroxyphenyl)benzotriazome, 2-(5'-tert-butyl-2'-hydroxyphenyl)-benzotriazole, 2-[2'-hydroxy-5'-(1,1,3,3-tetramethylbutyl)phenyl]benzotriazole, 2-(3'-5'-di-tert-butyl-2'-hydroxyphenyl)-5-chlorobenzotriazole, 2-(3'tert-butyl-2'-hydroxy-5'-methyl-phenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)-benzotriazole, 2-(3',5'-bis(1,1-dimethylbenzyl)-2'hydroxyphenyl)benzotriazole; mixture of 2-(3'-tert-butyl-2'-hydroxy-5'-(2-octyloxycarbonylethyl)phenyl)-5-chlorobenzotriazole, 2-(3'-tert-butyl-5'-[2-(2-ethyl-hexyloxy)carbonylethyl]-2'-hydroxyphenyl)-5-chlorobenzotriazole, 2-(3'-tert-butyl-2'-hydroxy-5'-(2-methyxycarbonylethyl)phenyl)-5-chlorobenzotriazole, 2-(3'-tert-butyl-2'-hydroxy-5'-(2-methoxycarbonylethyl) phenyl)benzotriazole, 2-(3'-tert-butyl-2'-hydroxy-(2-octyloxy-carbonylethyl)phenyl)benzotriazole, 2-(3'-tert-butyl-5'-[2-(2-ethyl-hexyloxy)carbonylethyl]-2'-hydroxyphenyl)-benzotriazole, 2-(3'-dodecyl-2'-hydroxy-5'-methylphenyl)-benzotriazole, and 2-(3'-tert-butyl-2'-hydroxy-5'-(2-isoocytyloxycarbonylethyl)-phenylbenzotriazole, 2,2'-methylenebis[4-(1,1,3,3-tetramethylbutyl)-6-benzotriazol-2-ylphenol]; transesterification product of 2-[3'-tert-butyl-5'(2-methoxycarbonylethyl)-2'-hydroxyphenyl]benzo-triazole with polyethylene glycol 300; [R—CH$_2$CH$_2$—COO (CH$_2$)$_3$]$_2$ where R=3'-tert-butyl-4'-hydroxy-5'-2H-benzotriazol-2-ylphenyl; [R-CH$_2$CH$_2$-COO(CH$_2$CH$_2$O) N/$_2$]$_2$ where n=1 to 5 and R=3'-tert-butyl-4'-hydroxy-5'-2H-benzotriazol-2-ylphenyl. A suitable commercially available benzotriazole is Norbloco® 7966, and 6000, from Jensen Pharma., Inc. Benzotriazoles are disclosed in U.S. Pats. 4,335,155, 4,405,749, and 4,528,311 which are incorporated herein by reference.

Further UV-absorbers include the class of ortho-hydroxyphenyl triazines such as 2-(2-hydroxyphenyl)-1,3, 5-triazines, for example 2,4,6-tris(2-hydroxy-4-octyloxyphenyl)-1,3,5-triazine, 2-(2-hydroxy-4-octyloxyphenyl)-4,6-bis-(2,4-dimethylphenyl)-1,3,5-triazine, 2-(2,4-dihydroxyphenyl)-4,6-bis-(2,4-dimethylphenyl)-1,3,5-triazine, 2-(2,4-dihydroxy-phenyl)-4,6-bis-(2,4-dimethylphenyl)-1,3,5-triazine, 2,4-bis(2-hydroxy-4-propyloxyphenyl)-6-(2,4-di-methylphenyl)-1,3, 5-triazine, 2-(2-hydroxy-4-octyloxyphenyl)-4,6-bis(4-methyl-phenyl)-1,3,5-triazine, 2-(2-hydroxy-4-dodecycloxyphenyl)-4,6-bis(2,4-dimethylphenyl)-1,3,5-triazine, 2-[2-hydroxy-4-(2-hydroxy-3-butyloxypropyloxy) phenyl]-4,6-bis(2,4-di-methylphenyl)-1,3,5-triazine and 2-hydroxy-4-(2-hydroxy-3-octyloxypropyloxy)-phenyl]-4, 6-bis(2,4-dimethylphenyl)-1,3,5-triazine. A suitable commercially available triazine is CYASORB® 1164, from Cytec Corp.

Hindered benzoate UV-absorbers include commercially available materials such as CYASORB(® 2908 from Cytec, and FERRO® AM 340 from Ferro Corp.

Further, in this specification, where a range is given, the figures defining the range are included therein.

Further, any group capable of being linear, branched or cyclic is linear, branched or cyclic.

For the avoidance of doubt, in this specification tert-butyl means tertiary butyl or $C(CH_3)_3$.

The following examples illustrate the invention in its various aspects. All parts and percentages are expressed by weight, representing grams of additives used per hundred grams of polyamide.

EXAMPLES

In the comparative examples and in the exemplary non-limiting embodiments of the invention described hereunder, the following types of polyamide-based polymers and additives are used:

1) PA-1 A polyamide 6 of the low-viscosity type suitable especially for injection molding and commercially available as Capron® 8202 NL from Allied Signal Corp.
2) PA-2 A transparent, amorphous, polyamide-polyether block copolymer suitable for injection molding and commercially available from EMS-CHEMIE, Domat/Ems, Switzerland.
3) PA-3 A semi-gloss polyamide 6 containing 0.3 wt.% of TiO$_2$ commercially available as Nylon 6 SD 1130 from DSM.
4) PS-1 A sterically hindered phosphonite processing stabilizer commercially available as Sandostab® P-EPQ from Clariant, Muttenz, Switzerland.
5) PS-2 A primary hindered phenolic antioxidant commercially available as Irganox® 1098 from Ciba Specialty Chemicals, Basle, Switzerland and which has the following structure:

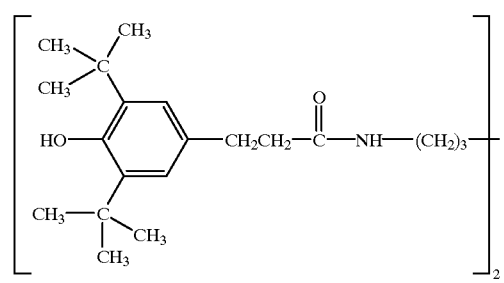

6) PS-3 An antioxidant which is a compound of the following formula:

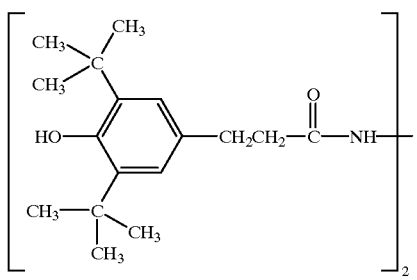

PS-3 is commercially available as Irganox® MD 1024 from Ciba Specialty Chemicals, Basle, Switzerland.

7) LS-1 A non-hydroxyl substituted oxanilide UV-absorber commercially available as Sanduvor® VSU from Clariant, having the following structure:

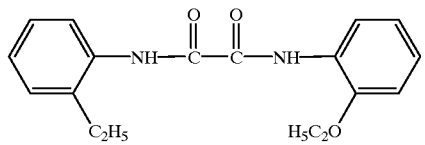

8) LS-2 An aromatic hindered piperidine UV-stabilizer commercially available as Nylostab® S-EED from Clariant, and which is a compound of the following formula:

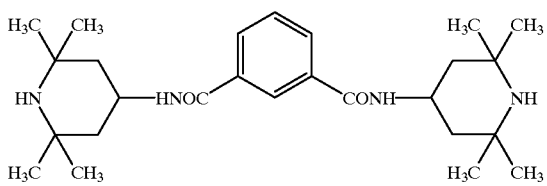

9) LS-3 A UV-stabilizer which is commercially available as Tinuvin (RTM) 770 from Ciba Specialty Chemicals in Basle, Switzerland and which is a compound of the following formula:

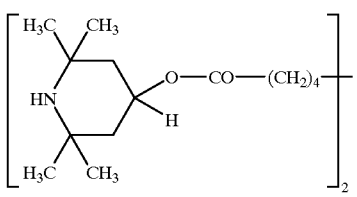

10) LS-4 A UV-stabilizer which is commercially available as Chimassorb (RTM) 944 from Ciba Specialty Chemicals in Basle, Switzerland or as Sand uvor (RTM) 3944 from Clariant in Muttenz, Switzerland and which is a compound of the following formula:

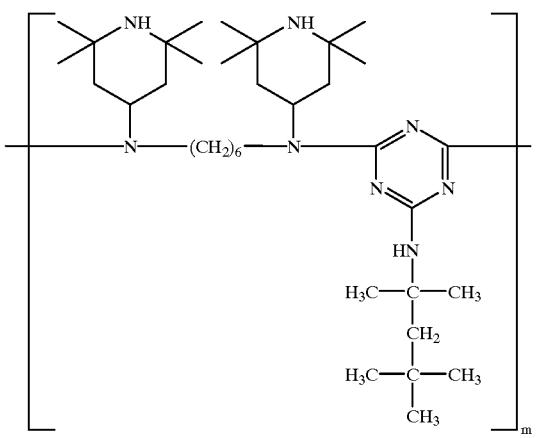

11) LS-5 A UV-absorber which is commercially available as TINUVIN® 234 from Ciba Specialty Chemicals in Basle, Switzerland and which is a compound of the following formula:

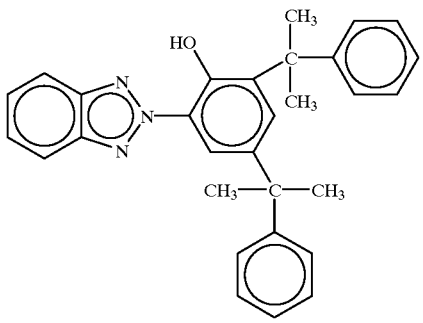

12) LS-6 A UV-absorber which is commercially available as TINUVIN® 327 from Ciba Specialty Chemicals, Basle, Switzerland and which is a compound of the following formula:

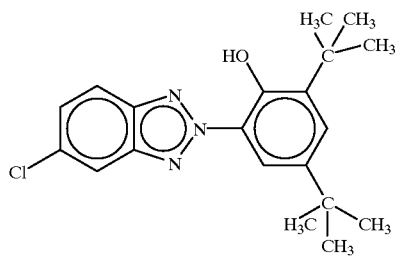

The tested samples were prepared as follows. According to the formulations described hereunder, the different types of polyamides were first melt compounded with the tested additives and extruded at temperatures of from 250–280° Celsius, followed bypelletizing into homogeneous pellets. These pellets were formed into panels 1 mm thick by injection molding at temperatures of from 280 to 300° Celsius, followed by either punching of the tested samples to 35 mm×40 mm or by direct injection molding of tensile bar specimens.

The color determination is reported in terms of the Yellowness Index (YI) determined in accordance with the ASTM E-313 Yellowness Test. The higher the value, the lower the color quality, i.e. the stronger the discoloration.

In addition, the color is measured according to the regulations of the CIE (international Commission on Illumination) and in accordance with the ISO 7724/3 and DIN 6174 standards. The higher the positive value of b*, the more pronounced the yellowing.

The tensile strength is measured in accordance with the ASTM D-638 standard.

The accelerated weathering test (Atlas WOM 65 WRC) is carried out according to the DIN 53387-A standard.

The results of the tests carried out with stabilizer compositions according to the invention and with stabilizers according to the prior art (for comparative purposes) applied to different types of polyamides are summarized in the tables 1–3.

TABLE 1

Yellowness index and b*-value of the various formulations containing PA-1 as polymer after proceessing into the tested samples.

| No. | Formulation | Yellowness index | b*-value |
|---|---|---|---|
| 1 | Ref. Sample | 1.36 | 0.61 |
| 2 | 0.1% PS-1 | 0.71 | 0.31 |
| 3 | 0.5% LS-1 | 4.03 | 1.79 |
| 4 | 0.1%/0.5% of PS-1/LS-1 | −2.42 | −1.06 |
| 5 | 0.5% LS-2 | 3.87 | 1.70 |
| 6 | 0.1%/0.5% of PS-1/LS-2 | −4.57 | −1.98 |
| 7 | 0.5% LS-5 | 17.20 | 7.86 |
| 8 | 0.1%/0.5% of PS-1/LS-5 | 15.07 | 6.85 |
| 9 | 0.5% LS-6 | 14.29 | 6.52 |
| 10 | 0.1%/0.5% od PS-1/LS-6 | 12.96 | 5.88 |

Test numbers 4 and 6 of table 1 are formulations according to the invention; test numbers 7–10 of table 1 are comparative tests.

The effect of the processing stabilizer PS-1 to improve the values of yellowing can be seen from the results shown in table 1. From the data of this table it can also be gathered that the preferable use of the UV-stabilizers LS-1 and LS-2 is clearly appropriate, although up to now some minor worsening had to be accepted in the preparation of light-stabilized polyamides.

Therefore, the synergism observed with the stabilizer composition according to the invention is totally unexpected. In spite of the high thermal stress during the processing of the polyamides into the tested samples, yellowing does not occur at all. The measured values of the Yellowness Index and of the b*-value do not only achieve the level of the reference sample but exceed the quality of the reference sample in a significant manner.

The comparative tests show that the use of the processing stabilizer PS-1 in combination with other light stabilizers than those according to the invention, such as LS-5 and LS-6 lead only to minor improvements of the yellowing values which are generally increased versus the reference as soon as a light stabilizer is present in the matrix to be stabilized. The synergism caused by the stabilizer composition according to the invention is not observed in other cases, i.e. the synergism is limited to the composition according to the invention only.

TABLE 2

Tensile strength (TS) and b*-value of various formulations containing PA-2 as polymer after exposure to accelerated weathering (WOM 65 WRC) for 1800 hours.

| No. | Formulation, always with 0.2% PS-2 | b*-value | TS (% of the original value) |
|---|---|---|---|
| 1 | Reference Sample | 7.85 | 29 |
| 2 | 0.6% LS-1 | 4.04 | 84 |
| 3 | 0.6% LS-2 | 4.71 | 39 |
| 4 | 0.6% LS-3 | 4.65 | 49 |
| 5 | 0.6% LS-4 | 5.40 | 40 |
| 6 | 0.3%/0.3% of LS-1/LS-2 | 2.62 | 96 |
| 7 | 0.3%/0.3% of LS-1/LS-3 | 3.05 | 88 |
| 8 | 0.3%/0.3% of LS-1/LS-4 | 3.58 | 82 |

Test number 6 of table 2 is a formulation according to the invention; test numbers 7 and 8 of table 2 are comparative tests.

If light stabilizers are not used the weathering causes a markedly increase of the yellowing value as well as a distinct worsening of the mechanical properties of PA-2 (cf. reference sample). Further, the data of table 2 shows that the high efficacy of the UV-stabilizer LS-1 exceeding clearly the effectiveness of the UV-stabilizers LS-2, LS-3 and LS-4 in view of the yellowing value b* and the tensile strength. As it is obvious from table 2, the combination of LS-1 and LS-2 surprisingly results in a pronounced synergism enabling the production of polyamides having a markedly improved light fastness, i.e. resistance against yellowing, as well as a better UV-fastness, i.e. retention of the mechanical properties.

TABLE 3

Table 3 illustrates b*-values and condition of the tested samples containing PA-3 as polyamide after exposure to accelerated weathering (WOM 65 WRC) at the time indicated.

| | Formulation always with 0.25 wt. % PS-2 | b*-value | Time of embrittlement |
|---|---|---|---|
| 1 | reference sample | n.d.[1] | 3000 h |
| 2 | 0.5%/0.25% of LS-1/LS-2 | 2.3 | >4000 h |
| 3 | 0.5%/0.25% of LS-1/LS-3 | n.d.[1] | 3000 h |
| 4 | 0.5%/0.25% of LS-1/LS-4 | 3.3 | >4000 h |
| 5 | 0.5%/0.25% of LS-5/LS-2 | 5.6 | >4000 h |
| 6 | 0.5%/0.25% of LS-5/LS-3 | 4.6 | >4000 h |
| 7 | 0.5%/0.25% of LS-5/LS-4 | 4.7 | >4000 h |

[1]sample decomposed-not measurable

Test number 2 of Table 3 is a formulation according to the invention; test numbers 3 to 7 of Table 3 are comparative tests.

In this test series, samples were exposed to accelerated weathering for up to 4000 hours followed by measurement of b*-yellowing and evaluation of embrittlement. The stabilized polyamide containing LS-1 with LS-2 according to the invention showed outstanding efficiency with regard to yellowing resistance and retention of mechanical properties. The stabilizer combination No. 2 of LS-1/LS-2 far outperformed those combinations of LS-1/LS-3 and LS1/LS-4 and accordingly any combinations of LS-5 evidencing an unexpected and unique result.

What is claimed is:

1. A process for stabilizing polyamide polymers against the damage effected by light, heat and/or oxidation comprising incorporating therein by melt-processing a synergistic additive system resulting in a uniform and intimate mixture with said polyamide, said additive system is selected from the groups consisting of (I) or (II), wherein (I) comprises from 0.01% to 1% by weight of a sterically hindered phenyl phosphonite (Ia), and from 0.05% to 5% by weight of anoxanilide (Ib), or said (Ia) together with from 0.05% to 5% by weight of an aromatic di- or tri-carbonyl compound containing at least one hindered amine moiety adjacent to said carbonyl(s) (Ic); and (II) comprises from 0.05% to 5% by weight of and oxanilide (IIa), and from 0.05% to 5% by weight of said aromatic di- or tri-carbonyl compound containing at least one hindered amine moiety adjacent to said carbonyl(s) (IIb), wherein the percentages represent grams of additives used per hundred grams of polymer.

2. The process according to claim 1 wherein the weight ratio of (Ia) to (Ib) is from 1:3 to 1:10, the weight ratio of (Ia) to (Ic) is from 1:3 to 1:10, and the weight ratio of (IIa) to (IIb) is from 1:5 to 5:1.

3. The process according to claim 1 wherein the weight ratio of (Ia) to (Ib) is from 1:3 to 1:6, the weight ratio of (Ia) to (Ic) is from 1:3 to 1:6 and the weight ratio of (IIa) to (IIb) is from 1:2 to 3:1.

4. The process according to claim 1 wherein the weight ratio of (Ia) to (Ib) and (Ia) to (Ic) is 1:4, 1:5 or 1:6, and the weight ratio of (IIa) to (IIb) is from 1:2 to 2:1.

5. The process according to claim 1 wherein said sterically hindered phenyl phosphonite has the following structure:

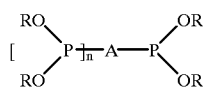

wherein each R is independently unsubstituted phenyl or a substituted phenyl with one, two or three alkyl groups each having from 1 to 12 carbon atoms or a substituted phenyl with one or two cumyl groups, n is 0 or 1, and A is an aromatic, mono- or difunctional $C_5$–$C_{30}$ moiety optionally containing further heteroatoms.

6. The process according to claim 5 wherein said sterically hindered phenyl phosphonite comprises a condensation product of a sterically hindered alkyl phenol with the Friedel-Crafts-reaction product of biphenyl and $PCl_3$.

7. The process according to claim 6 wherein said sterically hindered phenyl phosphonite contains a compound of the following formula 8. The process according to claim 6 wherein said sterically hindered alkyl phenol is selected from the group consisting of 2,4-di-tert-butyl phenol, 2-tert-butyl-4-cumyl phenol, 2,4-dicumyl phenol and 2,4-di-tert-butyl-5-methyl phenol.

9. The process according to claim 1 wherein said oxanilide has the following structure:

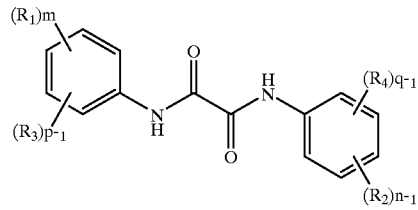

$R_1$ and $R_2$ are each independently of the other hydrogen, unsubstituted $C_1$–$C_{18}$alkoxy or $C_1$–$C_{18}$ alkoxy which is substituted by halogen, hydroxy, $C_1$–$C_5$ alkoxy, carboxyl groups, carbamyl groups or $C_1$–$C_{12}$ alkoxycarbonyl groups, or is $C_3$–$C_5$ alkenyloxy, unsubstituted benzyloxy or benzyloxy which is substituted by halogen or $C_1$–$C_5$alkyl, aliphatic acyloxy containing up to 18 carbon atoms, unsubstituted benzoyloxy or benzoyloxy which is substituted by halogen or $C_1$–$C_4$alkyl, or a radical of formula —A—$SO_3$M, wherein A is a direct bond or a divalent radical of formula —O—Q—, and Q is unsubstituted or hydroxy-substituted $C_1$–$C_6$alkylene, M is hydrogen or alkali metal, $R_3$ and $R_4$ are each independently of the other hydrogen, halogen, $C_1$–$C_{12}$alkyl, haloalkyl, phenyl or phenyl-$C_1$–$C_5$alkyl, or two radicals $R_3$ and/or $R_4$ in ortho-position each together form a fused 6-membered aromatic carbon ring, and wherein m and n are 1 or 2 and p and q are 1,2 or 3.

10. The process according to claim 9 wherein said oxanilide has the following structure:

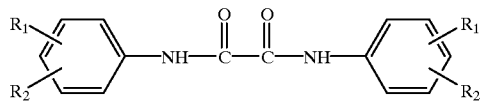

wherein $R_1$ and $R_2$ are each independently, identical or different substituents selected from the group consisting of hydrogen, linear, branched or cyclic alkyl having 1 to 12 carbon atoms, and alkoxy groups having 1 to 12 carbon atoms and 1 to 4 oxygen atoms.

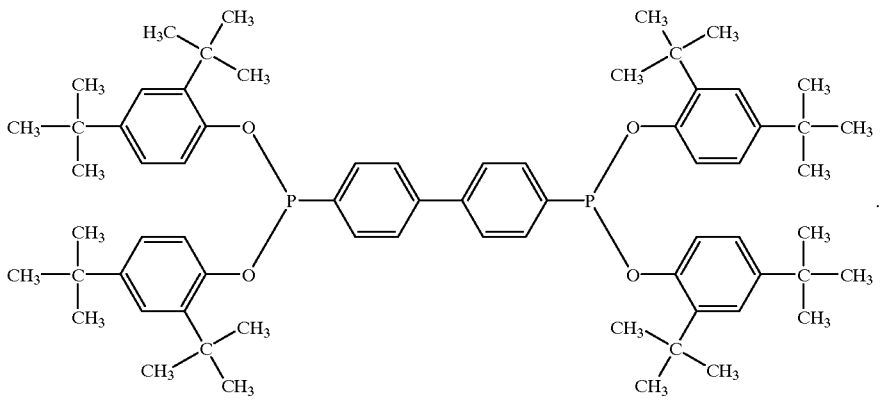

11. The process according to claim 10 wherein each $R_1$ is independently $C_{1-12}$alkyl or alkoxyl and each $R_2$ is hydrogen.

12. The process according to claim 1 wherein (II) is selected and wherein said aromatic di- or tri-carbonyl (ester) amide contains at least one hindered amine group adjacent to the carbonyl carbon, said aromatic di- or tri-carbonyl (ester)amide is given by:

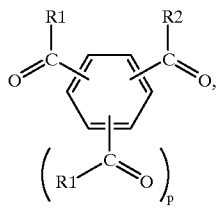

where p is 0 or 1, wherein at least one of $R_1$ and $R_2$ are independently, identical or different sterically hindered amino groups and the group(s) $R_1$ and $R_2$ other than sterically hindered amino group include, independently of the other, unsubstituted $C_1$–$C_{18}$alkoxy or alkamino which may optionally be substituted by halogen, hydroxy, $C_1$–$C_5$ alkoxy, carboxyl groups, carbamyl groups or $C_1$–$C_{12}$ alkoxycarbonyl groups, or is $C_3$–$C_5$ alkenyloxy, unsubstituted benzyloxy or benzyloxy which is substituted by halogen or $C_1$–$C_5$alkyl, aliphatic acyloxy containing up to 18 carbon atoms, unsubstituted benzoyloxy or benzoyloxy which is substituted by halogen or $C_1$–$C_4$alkyl.

13. The process of claim 12 wherein said hindered amino groups are:

(i)
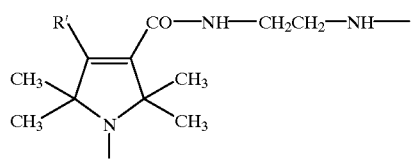

(ii)
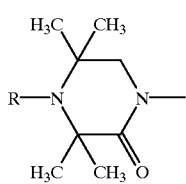

(iii)
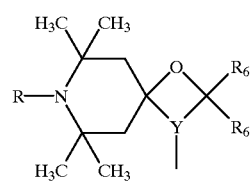

(iv)
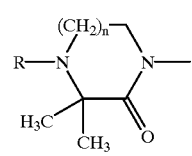

(v)
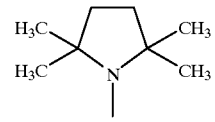

(vi)
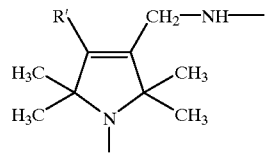

(vii)
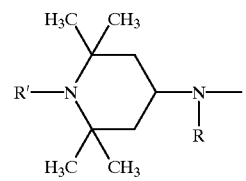

(viii)
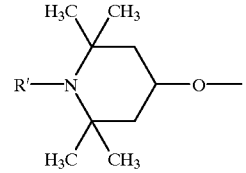

(ix)
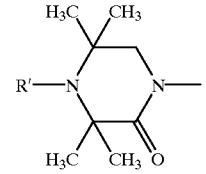

wherein R and R' are independently either hydrogen, $C_{1-12}$alkyl, $C_{1-8}$alkoxy, or —$COR_3$, n is 0 or 1, $R_3$ is hydrogen, $C_{1-6}$alkyl, phenyl, —COO($C_{1-4}$alkyl) or $NR_{15}R_{16}$, where $R_{15}$ and $R_{16}$ are independently hydrogen, $C_{1-12}$alkyl, $C_{5-6}$cycloalkyl, phenyl or ($C_{1-12}$alkyl)phenyl; or $R_{15}$ and $R_{16}$ together with the N-atom to which they are attached form a five- to seven-membered ring which may contain an additional N- or O-atom (preferably forming a piperidine or morpholine ring); and Y is the group —NCO or —OCN, where CO forms part of the cyclic structure; each $R_6$ of structure (iii) independently is selected from hydrogen, $C_{1-12}$alkyl or phenyl provided only one $R_6$ can be phenyl, or both groups $R_6$ together form the group —$(CH_2)_m$—; where m is 2 to 11, —$C(CH_3)_2$—, —$C(CH_3)_2$—$CH_2$—$CH_2$— or —$C(CH_3)CH_2CH_2CH(CH_3)$—.

14. The process according to claim 12 wherein said aromatic (ester)amide is a dicarboxylic (ester) amide with the structure:

(A)
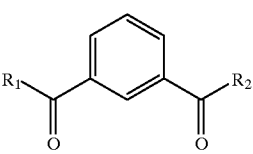

-continued or

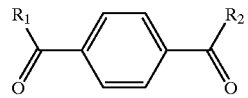

(B)

wherein at least one of $R_1$ and $R_2$ are independently, identical or different hindered amino groups(s), and the non-hindered amino group is independently selected from unsubstituted $C_1$–$C_{18}$alkoxy or alkamino which may be substituted by halogen, hydroxy, $C_1$–$C_5$ alkoxy, carboxyl groups, carbamyl groups or $C_1$–$C_{12}$ alkoxycarbonyl groups, or is $C_3$–$C_5$ alkenyloxy, unsubstituted benzyloxy or benzyloxy which is substituted by halogen or $C_1$–$C_5$ alkyl, aliphatic acyloxy containing up to 18 carbon atoms, unsubstituted benzyloxy or benzyloxy which is substituted by halogen or $C_1$–$C_4$alkyl.

15. The process according to claim 1 wherein said (ester) amide is a dicarboxylic-(estermide) of the structure

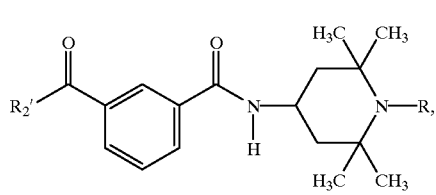

(B')

wherein $R_2'$ is independently $C_{1-20}$ alkyl, $C_{1-20}$ alkoxyalkyl, $C_{1-20}$ hydroxyalkyl, $C_{1-20}$ alkenyl, substituted $C_{1-20}$ alkenyl groups, $C_{1-20}$-alkoxy-$C_{1-20}$-alkyl groups, $C_{1-20}$-oxy-N-$C_{1-20}$-alkyl groups, -N-cyclic-$C_{1-10}$-alkyl groups, and cyclic-N-$C_{1-10}$-alkyl groups —$COR_4$, wherein $R_4$ is hydrogen, $C_{1-6}$alkyl, phenyl, and —$C_{1-20}$ COO(H or $C_{1-4}$-alkyl).

16. The process according to claim 1 wherein said (ester amide) has the structure:

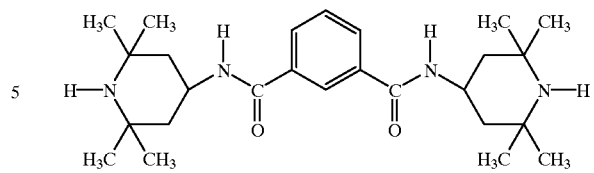

and said oxanilide has the following structure:

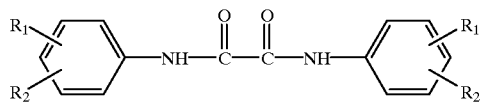

wherein $R_1$ and $R_2$ are each independently, identical or different moieties selected from hydrogen, linear, branched or cyclic alkyl or alkoxy groups having from 2 to 12 carbon atoms and from 1 to 4 oxygen atoms.

17. The process according to claim 1 wherein said additive system is selected from the group (Ill)

(Ill) is from 0.01% to 1% by weight of a sterically hindered phenyl phosphonite, from 0.05% to 5% by weight of said oxanilide and from 0.05% to 5% by weight of said aromatic di- or tri-carbonyl compound, and wherein the percentages represent grams of additives used per hundred grams of polymer.

18. A polyamide article selected from the group consisting of molded articles, extruded articles and fibers which comprise polyamide, optionally an organic dye, and in intimate homogeneous mixture therewith, an additive system selected from the group consisting of (I), (II) and (III) as defined in claim 1 or 14.

19. The article according to claim 15 comprising an additive system as defined in any one of the preceding claims 2 to 14.

* * * * *